US012256710B2

(12) United States Patent
Templeton

(10) Patent No.: US 12,256,710 B2
(45) Date of Patent: Mar. 25, 2025

(54) SERVICE ANIMAL TRACKING EVALUATION SYSTEM USING METRICS

(71) Applicant: Gordon Daniel Oke Templeton, Winnipeg (CA)

(72) Inventor: Gordon Daniel Oke Templeton, Winnipeg (CA)

(*) Notice: Subject to any disclaimer, the term of this patent is extended or adjusted under 35 U.S.C. 154(b) by 521 days.

(21) Appl. No.: 17/673,990

(22) Filed: Feb. 17, 2022

(65) Prior Publication Data

US 2022/0312730 A1 Oct. 6, 2022

Related U.S. Application Data

(60) Provisional application No. 63/168,438, filed on Mar. 31, 2021.

(51) Int. Cl.
| | |
|---|---|
| *A01K 11/00* | (2006.01) |
| *A01K 29/00* | (2006.01) |
| *G01S 19/26* | (2010.01) |
| *G01S 19/47* | (2010.01) |

(52) U.S. Cl.
CPC .......... *A01K 11/008* (2013.01); *A01K 29/005* (2013.01); *G01S 19/26* (2013.01); *G01S 19/47* (2013.01)

(58) Field of Classification Search
CPC ..... A01K 11/008; A01K 29/005; G01S 19/26; G01S 19/47
See application file for complete search history.

(56) References Cited

U.S. PATENT DOCUMENTS

| | | | |
|---|---|---|---|
| 11,399,513 B1* | 8/2022 | Dana ................ | A01K 29/005 |
| 2013/0250080 A1* | 9/2013 | Farrell .............. | G08B 25/016 |
| | | | 340/539.12 |
| 2014/0232541 A1* | 8/2014 | Trenkle ............. | G08B 25/10 |
| | | | 340/539.13 |
| 2015/0097668 A1* | 4/2015 | Toth ................. | A61B 5/02438 |
| | | | 600/300 |
| 2020/0029532 A1* | 1/2020 | Janakiraman ...... | G06V 20/40 |
| 2021/0341300 A1* | 11/2021 | Beaurepaire ...... | G01C 21/3492 |
| 2022/0030382 A1* | 1/2022 | Klasson ............ | G16H 10/60 |
| 2022/0046897 A1* | 2/2022 | Michell ............. | A01K 15/00 |
| 2022/0151207 A1* | 5/2022 | Mott ................. | A01K 11/008 |
| 2023/0309511 A1* | 10/2023 | Ould-Ahmed-Vall | ............... |
| | | | A01K 15/029 |
| | | | 119/719 |
| 2024/0000045 A1* | 1/2024 | Galvin ............. | G06Q 10/063 |

\* cited by examiner

*Primary Examiner* — Quan Zhen Wang
*Assistant Examiner* — Rajsheed O Black-Childress
(74) *Attorney, Agent, or Firm* — Ryan W. Dupuis; Michael R. Williams; Ade & Company Inc.

(57) ABSTRACT

A system measures tracking ability of a service animal using a location sensor to generate location data and a measurement unit measuring auxiliary data related to movement of the animal while tracking a known path. A computer calculates a rank metric representing a measure of similarity between animal location data from the location sensor and stored target data defining the known path. The computer also calculates an animal signature representative of a relationship between the auxiliary data and the rank metric for different instantaneous values of the rank metric. When tracking an unknown path, a confidence metric is calculated based on the animal signature and the auxiliary data collected while tracking such that the confidence metric represents a quantitative measure of the ability of the service animal to track the unknown path.

25 Claims, 9 Drawing Sheets

MAP

SERVICE ANIMAL TRACKING EVALUATION SYSTEM USING METRICS

This application claims the benefit under 35 U.S.C. 119(e) of U.S. provisional application Ser. No. 63/168,438, filed Mar. 31, 2021.

FIELD OF THE INVENTION

The present invention relates to an evaluation system for measuring performance characteristics of a service animal when accompanied by a handler for tracking purposes, and more particularly the present invention relates to an evaluation system capable of comparing the path of a service animal during a current tracking event to a known path being tracked, and/or comparing the performance characteristics of a service animal tracking an unknown path to typical performance characteristics of the service animal in tracking other paths.

BACKGROUND

When training a service animal such as a dog for tracking purposes, it is common for a handler to walk a prescribed route before tracking by the animal to generate a fresh prescribed path for the animal to track. The handler then guides the animal to follow the prescribed path and visually monitors the performance and behaviour of the animal to assess the tracking ability of the animal. This method of evaluating performance of the animal during tracking is highly subjective such that it is difficult to effectively compare the tracking ability of different animals relative to one another, and it is also difficult to monitor how effectively the animal is tracking while tracking an unknown path.

SUMMARY OF THE INVENTION

According to one aspect of the invention there is provided a tracking evaluation system for measuring tracking ability of a service animal accompanied by a handler while tracking a prescribed path during a tracking event, the system comprising:

- a tracking device arranged to be carried with the service animal, the tracking device comprising a location sensor arranged to sense animal location data representative of a location of the service animal as the service animal travels along an animal path during the tracking event; and
- a computer apparatus comprising a memory storing programming instructions thereon and a processor arranged to execute the programming instructions so as to be arranged to (i) store target location data representative of the prescribed path, (ii) receive the animal location data from the tracking device, and (iii) calculate a rank metric which represents a measure of similarity between the animal location data of animal path and the target location data of the prescribed path, along the prescribed path.

The system described herein provides a means of quantitatively measuring the tracking performance of a service animal and associated handlers to determine when the animal has been adequately trained and how well the animal performs with one or more handlers compared to other animals.

The system may further comprise a display in communication with the processor of the computer apparatus in which the processor is arranged to execute the programming instructions so as to be arranged to display a map including both the prescribed path and the animal path thereon.

The calculation of the rank metric may be based upon a deviation of the animal location data from the target location data along the prescribed path. Preferably the calculation of the rank metric is further based upon a speed of the animal along the animal path. Preferably the processor is arranged to calculate the speed based on the animal location data.

The processor of the system is preferably arranged to calculate the rank metric in real time as an instantaneous value that varies along the animal path.

The processor is preferably arranged to execute the programming instructions so as to be arranged to identify different regions along the animal path having different measures of similarity by comparing the rank metric to one or more similarity thresholds.

The processor of the system may be further arranged to execute the programming instructions so as to be arranged to display a map that visually distinguishes between the different regions that have different instantaneous values of the rank metric on a display in communication with the processor.

The system may further comprise a measurement unit operatively connected to the tracking device, the measurement unit being arranged to measure auxiliary data related to movement of the tracking device in real time as the tracking device is displaced along the animal path during the tracking event.

The processor is preferably arranged to (i) store the auxiliary data in association with the instantaneous value of the rank metric and (ii) calculate an animal signature representative of a relationship between the auxiliary data and the rank metric for different instantaneous values of the rank metric.

When the tracking device includes a unique animal identification stored thereon that identifies the service animal and the computer apparatus includes a unique handler identification stored thereon that identifies the handler, the processor of the computer apparatus may be further arranged to execute the programming instructions so as to be arranged to store the rank metric on the computer apparatus with both the unique animal identification and the unique handler identification associated therewith for subsequent retrieval by the processor to calculate the animal signature.

The measurement unit may include an acceleration sensor carried on a wearable device adapted to be worn by the service animal to record animal movement data representative of movement of the head and/or gate of the animal as the animal moves along the animal path.

The measurement unit may further include an ambient condition sensor arranged to measure one or more ambient conditions. In this instance, the processor of the computer apparatus may also be arranged to execute the programming instructions so as to be arranged to record the rank metric with the one or more ambient conditions associated therewith.

Once an animal signature has been calculated, the system may be further used for measuring an ability of the service animal to track an unknown path. In this instance, the processor of the computer apparatus is preferably further arranged to execute programming instructions so as to (i) store the auxiliary data from the measurement unit as the service animal tracks the unknown path, and (ii) calculate The confidence metric may be an instantaneous confidence value calculated at each time stamp and/or an overall confidence value that is representative of the instantaneous confidence value over a range of time stamps or over the duration of the event.

The computer apparatus may be arranged to store the confidence metric in association with the animal location data from the tracking device as the confidence metric varies along the animal path.

The tracking device may include a communication antenna, a memory storing programming instructions thereon, and a processor in operative communication with the memory of the tracking device, the location sensor and the communication antenna of the tracking device. In this instance, the processor may be arranged to receive the animal location data from the location sensor and transmit the animal location data wirelessly to the computer apparatus.

The tracking device may include a condition sensor operatively connected thereto and arranged to sense at least one condition as the service animal travels along an animal path.

The condition sensor may include an ambient weather condition sensor arranged to measure one or more ambient weather conditions, in which the processor is arranged to store the rank metric with the one or more ambient conditions associated therewith.

The condition sensor may also include an internal condition sensor arranged to be inserted subcutaneously within the tracking animal so as to be arranged to measure one or more biological conditions of the tracking animal, in which the processor is arranged to store the rank metric with the one or more biological conditions associated therewith.

The computer apparatus may include a portable operator device arranged to be carried by an operator, the operator device being arranged to receive the animal location data wirelessly from the tracking device.

The memory and the processor that are arranged to calculate the rank metric may be located on the portable operator device.

The computer apparatus may further include a remote server in communication with the portable operator device over a wireless communications network, in which the processor is arranged to execute the programming instructions so as to be arranged to transmit the rank metric from the portable operator device to the remote server for storage on the remote server, and in which the remote server is in communication with a plurality of different portable operator devices that are identical in configuration so as to be arranged to receive the rank metrics from the plurality of different portable operator devices.

The portable operator device may include a location sensor arranged to sense operator location data representative of a location of the operator, the processor being arranged to execute the programming instructions so as to be arranged to store the target location data representative of the prescribed path on the portable operator device by (i) receiving the operator location data as the operator walks along the prescribed path and (ii) using the operator location data to define the target location data.

According to a second aspect of the present invention there is provided a tracking evaluation system for measuring tracking ability of a service animal accompanied by a handler while tracking an unknown path, the system comprising:

a tracking device arranged to be carried with the service animal, the tracking device comprising a location sensor arranged to sense animal location data representative of a location of the service animal as the service animal travels along an animal path, and a measurement unit arranged to be carried on the service animal to measure non-location auxiliary data including accelerations related to movement of the animal while the tracking device is displaced along the animal path; and a computer apparatus comprising a memory storing programming instructions thereon and a processor arranged to execute the programming instructions so as to be arranged to:

(i) store an animal signature representative of a relationship between (i) the auxiliary data from previous tracking events and (ii) a measure of tracking ability of the service animal based on deviation of a path of the tracking device from a known path from the previous tracking events;

(ii) store the auxiliary data collected as the service animal tracks the unknown path;

(iii) calculate a confidence metric based on the calculated animal signature and the auxiliary data collected while the animal tracks the unknown path, the confidence metric representing a quantitative measure of the ability of the service animal to track the unknown path.

The computer apparatus may be arranged to calculate the confidence metric as an instantaneous value at each time step, and/or calculate the confidence metric as an overall value representative of a range of time stamps or a duration of the tracking of the unknown path.

The calculation of the confidence metric allows the performance of the service animal when tracking an unknown path to be gauged compared to the typical performance of the service animal so that a quantitative value is provided to the handler to assist in assessing their degree of confidence that the animal is successfully tracking the unknown path.

As described herein, the ability of service dog in training is evaluated with respect to the global database. This allows dogs to be "ranked" against each other.

A dog on a mission is evaluated (with higher weight) with respect to itself (i.e. its animal signature).

With regard to the animal signature, the parameters associated with high confidence of dog "A" may look different than the parameters associated with high confidence of dog "B"; however, their ability (rank) can still be evaluated since it is performance based on comparison to their own established animal signature via the algorithms.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1A:
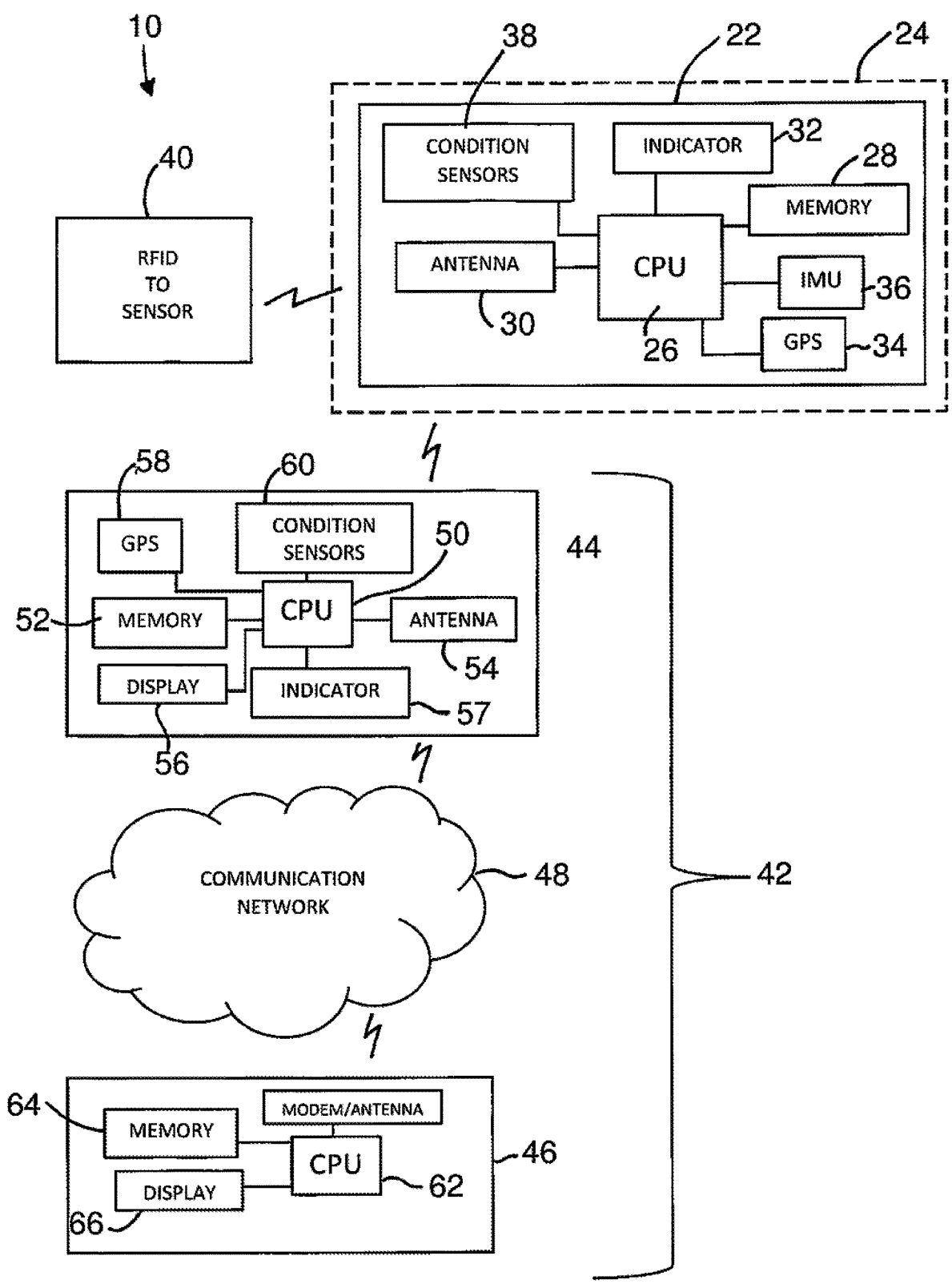
FIGS. 1A and 1B are schematic representations of the tracking device, the handler device, and the remote server of the tracking evaluation system according to the present invention.

Referring to the accompanying figures, there is illustrated a service animal evaluation system 10 for measuring tracking ability of a service animal 12, for example a canine, that is being managed or handled by an accompanying handler 14.

The system 10 can be used both for training to measure and rank the performance or tracking ability of the service animal compared to a known path, to past performance or to the performance of other animals. In this instance, the handler 14 can initially walk a prescribed path 16 from which target location data is acquired by the system to be recorded by the system. The handler 14 then guides the service animal 12 to track the prescribed path. Animal location data is then acquired by the system as the service animal walks along a resulting animal path 18 while attempting to track the prescribed path. The acquired target location data of the prescribed path 16 and the animal location data of the animal path are stored for subsequent analysis by the system.

The system 10 can also be used to measure the performance of the service animal in real time during a mission when an unknown path 20 is being tracked by the service animal by comparing real time metrics related to performance of the animal using data acquired from the current animal path 18 to a history of recorded corresponding metrics related to past performance of the animal while tracking previous paths to determine a confidence level in the current performance of the service animal during the mission.

Figure 1B:
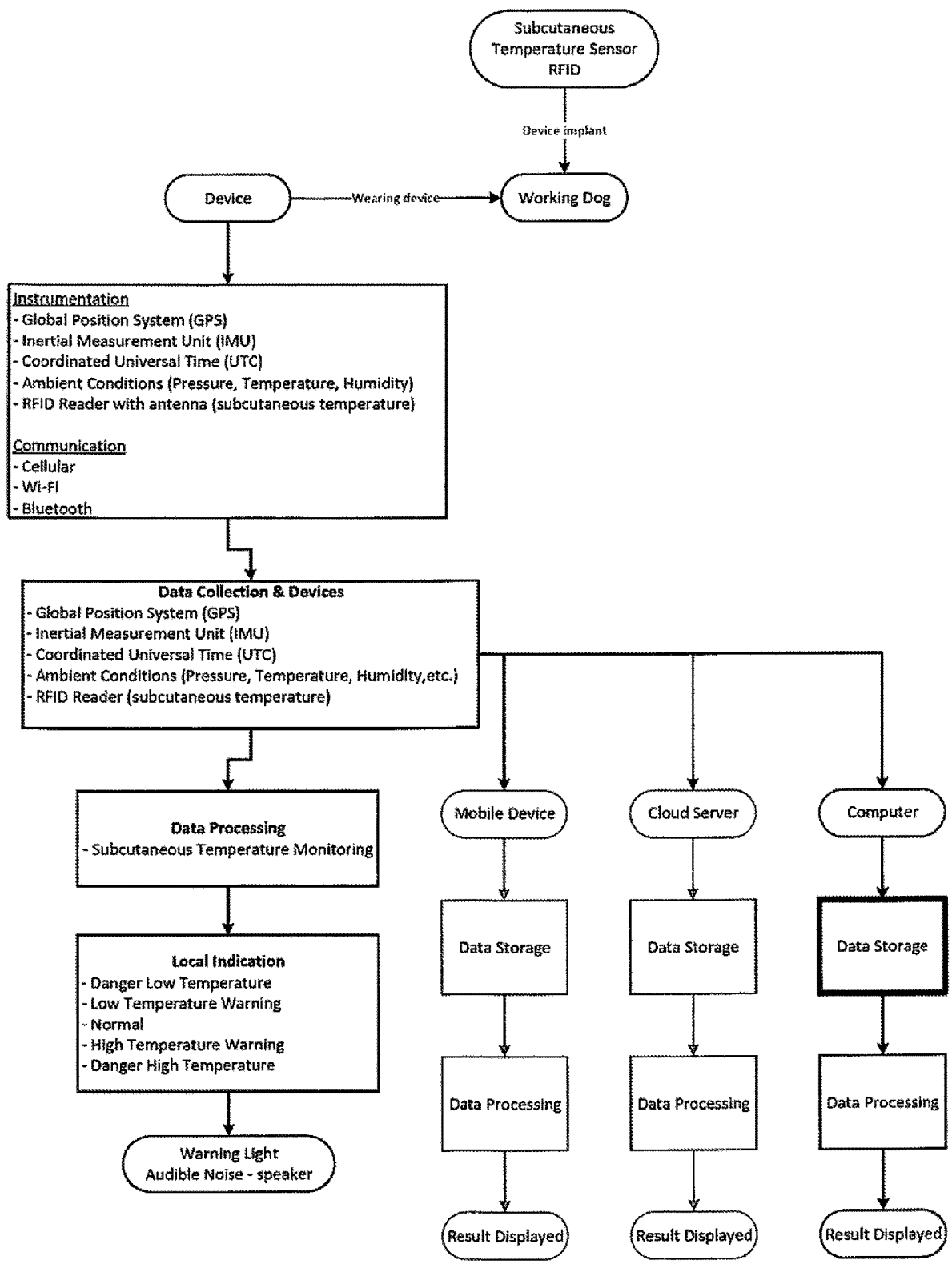
Figure 2:
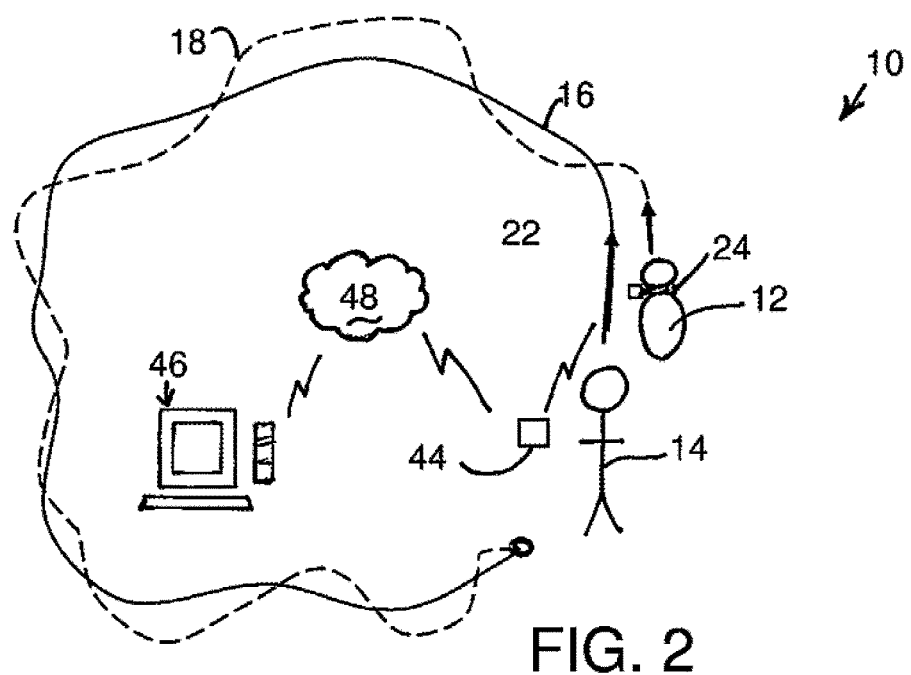
FIG. 2 is a schematic representation of the evaluation system when used during a training event for comparing the animal's path to a known prescribed path for measuring tracking performance of the animal.
Figure 3:
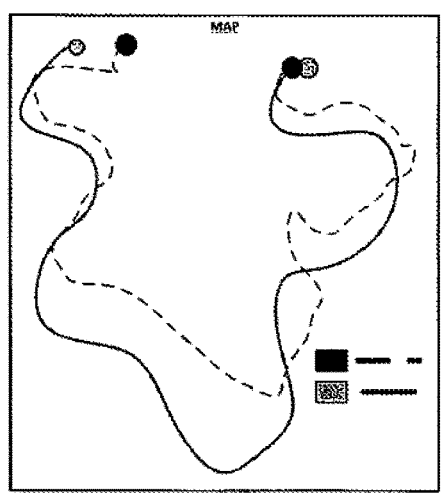
FIG. 3 is a schematic representation of an exemplary graphical output of the system following a training event in which the animal tracks a known prescribed path.
Figure 3:
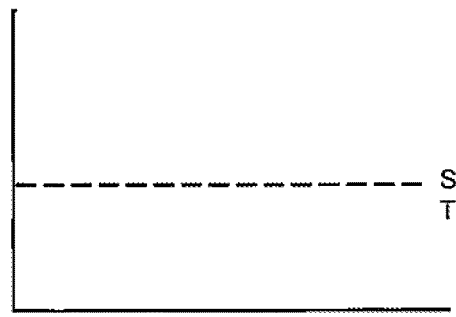
Figure 4:
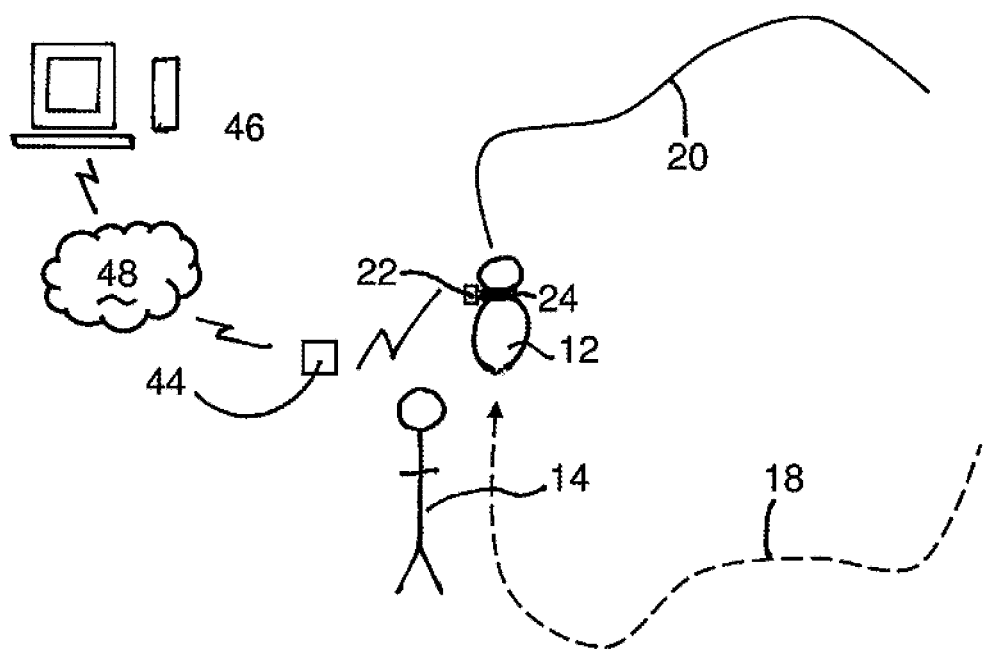
FIG. 4 is a schematic representation of the evaluation system when used during a mission event for evaluating performance characteristics of the animal when tracking an unknown path as compared to typical performance characteristics of the animal when tracking previous paths.

Turning now initially to FIG. 1, the system generally includes a tracking device 22 arranged to be supported on a wearable device 24, for example a collar worn about the neck of the animal 12 or a harness worn about the torso of the animal 12. The tracking device 12 is a portable electronic device including an internal processor 26 in communication with a memory 28 storing programming instructions thereon for executing the various functions of the tracking device as described herein. The central processing unit also communicates with a communications antenna 30 that is arranged to communicate data externally of the tracking device. The tracking device also includes an indicator 32 in communication with the processor 26 which can be activated for alerting the handler of an alert condition as may be determined by the processor during operation. The indicator may be a light or speaker for emitting sound for example.

The tracking device collects data from various means. To accomplish this, the processor communicates with an onboard GPS sensor 34 arranged to communicate with a global positioning satellite system to determine a location of the tracking device and accordingly the location of the corresponding animal upon which the tracking device is carried. The location data may be recorded together with a time stamp indicating current time from an internal clock of the tracking device so that the intervals between time stamps and the distance between recorded the location data points can be used to calculate speed of the animal along the animal path.

The tracking device further includes an inertial measurement unit (IMU) sensor 36 including acceleration sensos capable of measuring linear accelerations along multiple different axes and changes in angular orientation to track various movements. The resulting IMU data generated by the sensor 36 may be representative of head movements of the animal along various axes, for example lateral head movements oriented transversely to the direction of movement of the animal along the path, longitudinal head movements in the direction of the along the path, and/or vertical movements. The collected acceleration data may also be used to determine gate of the animal.

The tracking device may further include a plurality of condition sensors 38 supported thereon for measuring various conditions such as the ambient temperature, ambient humidity, atmospheric pressure, or various conditions relating to the animal.

An auxiliary condition sensor 40 may be provided externally of the housing of the tracking device within a separate housing which is suitable for subcutaneous use under the skin of the animal. In this instance, the condition sensor 40 preferably comprises an RFID circuit in communication with a communications antenna and a temperature sensor so that the condition sensor 40 can measure a subcutaneous temperature of the animal and then communicate the measured temperature wirelessly from the auxiliary condition sensor 40 to the internal processor of the tracking device. The auxiliary condition sensor may be further arranged to measure other biological conditions of the animal such as heartrate for example.

The tracking device carried by the animal communicates with a separate computer apparatus 42 capable of processing the data collected by the tracking device to calculate various metrics used in evaluating the performance of the service animal. In the illustrated embodiment, the computer apparatus 42 includes (i) a handler device 44 in the form of a portable electronic device carried by the handler 14 in proximity to the service animal 12, and (ii) a remote server 46 located remotely from the handler device and the tracking device for communication with the handler device over a suitable communications network 48.

The handler device includes a central assessing unit 50 in communication with a memory 52 storing programming instructions thereon for executing the various functions of the handler device as described herein. The central processing unit also communicates with a communications antenna 54 of the handler device that is arranged to communicate data with external devices including the tracking device 22 and the remote server 46. The communications antenna may be able to communicate wirelessly with the tracking device or communicate over a mobile telephone network, or communicate with a local wireless network as may be desired depending upon the configuration of the system and the type of information being communicated.

The handler device also includes a display 56 through which various data and metrics can be displayed to the handler. In a preferred embodiment, the handler device 44 may comprise a portable electronic device such as a smart phone that is capable of displaying information on the screen of the phone and which uses the antenna of the phone to communicate with external devices. The handler device may also include a separate indicator 57 such as a light independent of the display or a speaker through which various alerts can be visually or audibly communicated to the handler.

The handler device 44 can also collect data from various means. Preferably the handler device also includes an onboard GPS sensor 58 arranged to communicate with a global positioning satellite system to determine a location of the handler device. The handler device 44 can also include a plurality of condition sensors 60 supported thereon for measuring various conditions such as ambient temperature, ambient humidity, atmospheric pressure or other conditions related to the environment within which the animal and the handler are located.

The remote server 46 comprises any form of computer device including a central processing unit 62 in communication with a memory 64 storing programming instructions thereon for executing the various functions of the remote server as described herein. The remote server 46 also includes a display 66 and an input device of conventional type used on a personal computer so that an operator at the location of the remote server can interact with the remote server to view various data and metrics displayed on the display and to respond to various prompts of the system with suitable instructions.

When used for training, the system 10 is typically initially used by supporting the tracking device 22 on the service animal 12 while the handler device 44 is carried by the handler 14. The handler can initially store a prescribed path by carrying the handler device as a prescribed path is walked by the handler. The GPS sensor 58 of the handler device is used to determine the location of the handler as the handler moves along the prescribed path such that the resulting target location data generated by the GPS sensor is stored as a path on a map by the handler device. The recording of the prescribed path of the handler is done independent of the service animal and provides a datum, truth or reference path for use by the computer in measuring similarity of the animal path to the prescribed path.

Once a prescribed path has been recorded, the handler then guides the service animal to track the prescribed path. The resulting animal path 12 walked by the animal results in the tracking device generating various data including animal location data that defines the resulting animal path and speed along the path using the GPS sensor 34 of the tracking device and IMU data generated by the IMU sensor 36 that includes acceleration, and movements of the animal such as linear head movement along X, Y, Z axes, rotational movements of roll, yaw and tilt about the X, Y and Z axes, and animal gate. The various data recorded and collected by the tracking device is stored on the memory of the tracking device and is also communicated externally of the tracking device in real time by wireless communication with the handler device. The information collected by the handler device can also optionally be relayed in real time to the remote server over the communications network.

The handler device 44 compares the animal location data of the animal path to the target location data of the prescribed path and calculates a deviation between the animal path and the prescribed path which represents a measure of similarity between the animal path and the prescribed path. The calculation of the deviation can be done in real time such that the deviation is a variable value along the length of the prescribed path representing a deviation of the animal path from the prescribed path. A rank metric can be calculated as a quantitative measure that represents the deviation, but which also factors in the speed of the animal along the path in which the speed is also derived from the GPS information. For instance, if two identical tracks are performed, the one that is performed faster would receive a higher rank metric or score. The rank metric thus represents both similarity and the efficiency that the track is being performed. Several other metrics can also be referenced to establish the rank or score of the tracking of the animal during a particular tracking event. The rank metric allows the performance of the service animal to be compared to the performance of other animals by comparing the rank metrics or scores between the animals.

The various collected data is further analysed to produce various graphical displays that can be generated for viewing by the handler on the display of the handler device. Graphical displays may include a map illustrating the prescribed path and the animal path overlaid on the prescribed path. The graphical displays can also include a graph in which the magnitude of deviation of the animal path relative to the prescribed path can be graphically represented along the length of the prescribed path. By comparing the amount of deviation or the calculated rank metric to a similarity threshold, the handler device is able to distinguish between different regions having varying similarity relative to the prescribed path. Regions contained within the range of the similarity threshold are identified as regions of high confidence in the tracking ability of the service animal, whereas regions where the rank metric or the overall deviation between the paths exceeds the similarity threshold are identified as regions of low confidence in the tracking ability of the service animal.

With each use of the tracking device and handler device for training, the collected data relating to the animal path and the corresponding prescribed path being tracked is communicated to the remote server and recorded on the memory thereof. The collected data can be used for performing various additional analytics. The remote server 46 may communicate with a plurality of different handler devices and corresponding tracking devices. Each tracking device 22 is preferably associated with a specific service animal and includes a unique serial number or identification number associated therewith which is stored on the memory 28 of the tracking device 22. All data associated with the tracking device includes the unique animal identification associated therewith. Likewise, each handler device 44 is typically associated with a specific handler and includes a unique serial number or identification number associated therewith which is stored on the memory 52 of the handler device 54. All data associated with each handler device 44 includes the unique handler identification associated therewith. When all data from various devices have been reported to the remote server 46, the remote server is capable of storing all of the data according to the various identifications of the animals and the handler.

Each unique combination of a handler identification and an animal identification is recorded on the remote server 46 as a unique team and the resulting team object is created. Various analytics can be calculated which are associated with each resulting team object.

All of the data from various animals and from various handlers can also be collectively analysed to obtain a measure of the average performance of all service animals in tracking various different prescribed paths at different training events. When calculating metrics representative of the average ability of a typical service animal, the various collected data can be corrected for extreme measured conditions that fall outside of acceptable thresholds. This can be accomplished by recording ambient conditions using the condition sensors, or obtaining ambient conditions from a third party weather service, and attaching the measured conditions to the collected data. Any conditions that fall outside of acceptable limits can be used to adjust corresponding portions of the data from further analytics.

Some of the data analysis that can occur at the remote server may include calculation of a rank metric which is representative of the performance of a service animal during one training event or a group of training events as compared to previous calculated performances of the same animal or other animals. The performance of the same animal with different handlers can also be measured. Likewise, the performance of specific handlers using different animals can be measured.

The remote server can also be used for calculating an animal signature defines a mathematical relationship between (i) the rank metric which is representative of the tracking ability of the service animal and (ii) various auxiliary data stored in association with the rank metric such as ambient weather conditions, measured biological conditions of the animal, and data from the measurement unit representing head movement and gate from a plurality of previous tracking events. The animal signature is established and calculated using only data having a unique team object comprising a unique pairing of a handler identification and a service animal identification. In this instance, data is collected from the IMU sensor 36 of the tracking device 22 and the GPS sensor 34 including direction, speed, and acceleration of the animal along the animal path as well as lateral movements and accelerations transversely to the animal path resulting from head movements of the animal. All of the collected data from the tracking device can then be used to calculate one or more values representative of typical performance characteristics of the service animal and handler pairing over a plurality of tracking events. The performance characteristics may include average speed, specified head movement patterns, gate, etc. that are associated with low deviation and thus high confidence when following the animal path. The auxiliary data associated with the rank metric may also use subcutaneous temperature and ambient conditions. These values will be incorporated into the machine learning algorithm, as they may or may not have an effect in performance; however, the machine learning algorithm will assign a weight and a bias to these variables.

The system 10 can also be used to gauge the performance of the service animal during a live mission in which the service animal is tracking an unknown path as noted above. In this instance, the same data collected from the tracking device to calculate the signature metric is collected for the current live mission based on the animal path followed by the service animal. Again, this collected data includes various auxiliary non-location data such as data from the measurement including accelerations, rotational movements, head movement data, gate, as well as location data from the GPS sensor.

Using machine learning in the form of a neural network, various patterns within the auxiliary data can be recognized and established as being associated with regions of high confidence represented by a high instantaneous value of the calculated rank metric when tracking known paths. These recognized patterns establish the animal signature. When auxiliary data is collected from tracking of an unknown path, patterns in the current auxiliary data that are similar to patterns associated with high confidence in the animal can be used to calculate a confidence metric, that represents an estimated rank metric but without knowing the deviation between the current animal path and the prescribed path being tracked.

Figure 5:
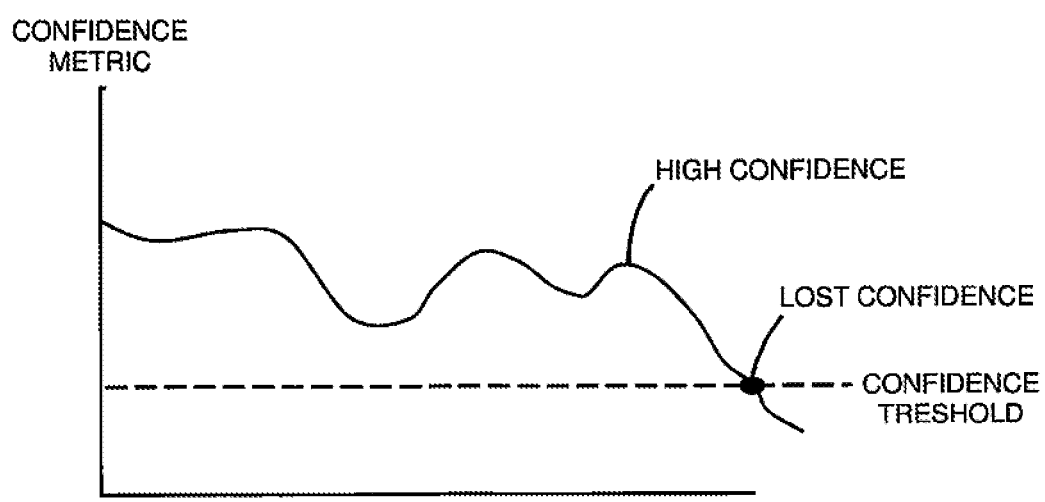
FIG. 5 is a schematic representation of an exemplary graphical output of the system following a mission event in which the animal tracks an unknown path.

The overall confidence in the service animal's abilities while tracking the unknown path can thus be measured in real time by calculating the confidence metric representative of the similarity of the performance of the service animal tracking the unknown path to a performance of the service animal tracking the different prescribed paths of the previous tracking events. As stated above, the confidence metric is calculated by comparing the current performance metrics to the historical animal signature of the service animal and handler pairing. The confidence metric is thus a variable instantaneous value that can be calculated at each time step and that varies in real time along the animal path. This can be graphically represented as shown in FIG. 5. The remote server can also compare the instantaneous confidence metric to a confidence threshold 70 in real time so that regions of high confidence can be identified where the confidence metric remains within the range of the confidence threshold, and different regions of low confidence can be identified where the confidence metric exceeds the range of the competence threshold. The confidence metric can also be calculated as an overall value representative of a range of time stamps or representative of the entire duration of the tracking event of the animal tracking the unknown path.

During a live mission, an operator at the remote server viewing the display 66 of the remote server can view the data in real time and identify where confidence in the tracking ability of the animal has been lost due to the confidence metric falling outside of the confidence threshold. The system can automatically generate an alert to the handler through an indicator of the handler or an indicator on the tracking device. When confidence in the tracking has been lost and it is determined that the service animal has lost track of the unknown path, directions can be given by an operator at the remote server or by the system itself through the display of the handler device to return the handler to the last location where the confidence metric remained in a region of high confidence.

When the system is arranged to collect GPS location information from the animal while the animal tracks the unknown path, the system may be further arranged to graphically display the collected GPS location as the animal's path on a map. When further calculating the confidence metric as an instantaneous value at each time step, and thus at each GPS location marked along the map, the system may be further arranged to indicate the precise location on the map wherein the calculated instantaneous confidence metric falls below the competence threshold. This serves as a location where the handler can return to with the animal when confidence has been lost to resume tracking from a location along the path where the animal remained confident.

More details with regard to the collection of data, calculation of the rank metric and the confidence metric are provided in the following.

Instruments contained on device include: Coordinated Universal Time (UTC); Global Positioning System (GPS);

Inertial Measurement Unit (IMU); Subcutaneous Temperature; Ambient Temperature; Ambient Pressure; and/or Ambient Conditions acquired from 3rd party (Pressure, Temperature, Humidity, Wind Speed, Precipitation). All data is collected and marked with a timestamp.

Process Narrative—Training

The trainer or handler performs a datum track. The device will record the GPS position at specified time intervals. This track is known as the truth or datum track. Although each point on the datum track has a timestamp (or identification point) associated with it, it is independent of time. The data is successive GPS points.

Then the K9 will perform the training run and collect all of the information previously specified. The following metrics will be calculated. Track difficulty: calculated based on: Environment (rural vs urban); Ambient Conditions; Total angle of direction change; and Elevation change.

Instantaneous Deviation: Using the GPS location of the training and datum tracks, the distance between the training track and the datum track can be determined. To determine this value at each timestamp, the following process is performed.

Time=0

At training run "time=0" the distance between the current position 'P' and each datum track point is calculated. The minimum distance calculated using the Pythagorean Theorem is recorded as the instantaneous deviation. The associated data point 'P1' on the datum track is used as the reference for successive calculations.

Time>0

To make the calculations more efficient for instantaneous deviation, at training run 'time=1', rather than calculating the distance between the current position 'P3' and every point on the training run, a circle of radius 'R'; where R=n×Vmax and Vmax=the maximum velocity of the K9 team under ideal circumstances, for example in which n may be equal to 5 or another multiple.

The closest point on the datum track is then determined using Pythagorean Theorem, call this Point 'P1' with associated distance 'D13'. Although this is the closest data point, there may be a closer location:
 (a) Point 'P4' on the line between the previous datum track data point 'P0' and 'P1' (creating line 'L1')
 (b) Point 'P5' on the line between the subsequent datum track point 'P2' and 'P1' (creating line 'L2').
 (c) Using vector geometry, the orthogonal distance between 'P3' and lines L1 is calculated 'D34' and P4 is determined.
 (d) Using vector geometry, the orthogonal distance between 'P3' and L2 is calculated 'D35' and P5 is determined.
 (e) If P4 is between P0 and P1 it is valid.
 (f) If P5 is between P1 and P2 it is valid.
 (g) D12, D34 and D35 are compared, the lowest value calculated of the three is the instantaneous deviation.

Total Deviation: The integrated value of the deviation with respect to time curve.

Normalized Total Deviation: The statistical normalization of the Total Deviation based on the track length.

Instantaneous Direction: The unit direction vector calculated at each timestamp by using the current position relative to the position in the previous timestamp.

Instantaneous Direction Accuracy: The dot product of the run track direction vector and the datum track direction vector.

Distance: distance travelled between successive data points

Speed: the distance travelled between successive data points divided by the sampling time interval.

Velocity: the speed multiplied by the unit instantaneous direction vector

Normalized speed: current speed vs the maximum team speed.

Change in deviation: the change in instantaneous deviation between data points.

Normalized deviation change: Change in deviation divided by the maximum speed.

Instantaneous Velocity Factor: Normalized speed multiplied by the Instantaneous Direction Accuracy.

Instantaneous Rank=1-(% max deviation change)+(velocity factor) Overall run metrics:

Time efficiency=theoretical minimum time/actual time; theoretical minimum time=track length/maximum speed.

Speed Efficiency=avg speed/maximum speed.

Deviation Sum: The sum of the instantaneous deviation at each timestamp.

Distance efficiency=total distance travelled during run track/total length of datum track.

Rank=Average of instantaneous confidence. This will be a % score. It will determine if the K9 team is ready to progress to more difficult tracks.

These metrics will be combined with the other sensor data and placed into a machine learning algorithm that will identify trends correlating peripheral sensor data with high rank scores. The run can be parsed into smaller data packets that establish particular rank intervals for a minimum duration. For example, maintain a rank score between 51-60%, 61-70%, etc. for a minimum of 10 seconds. These smaller data packets would be able to generate multiple useable data sets within a single run.

A Fast Fourier Transform (FFT) will be performed on the IMU data in the analyzed data packets which will identify trends in movement associated with different rank scores.

This total scope of information combined with trend identifications with high confidence will create the K9 Team Signature. This will allow to a substantially instantaneous confidence to be calculated/inferred in a live scenario where a Datum Track is unavailable. More particularly, the confidence measurement would represent confidence at the closest sampling point based on frequency so as to be near instantaneous.

Process Narrative—Mission

During a live mission, the datum track is unavailable. Consequently, the metrics surrounding deviation are unable to be calculated. Therefore, the other data being recorded must be used to infer the instantaneous confidence.

While the track is being performed the device will use all of the sensor data while performing an FFT on the IMU. These values will be processed using a machine learning algorithm and reference the K9 signature for the team that was established during training. This process will allow the command center to establish the instantaneous confidence of the K9 team and provide guidance as necessary.

Figure 6:
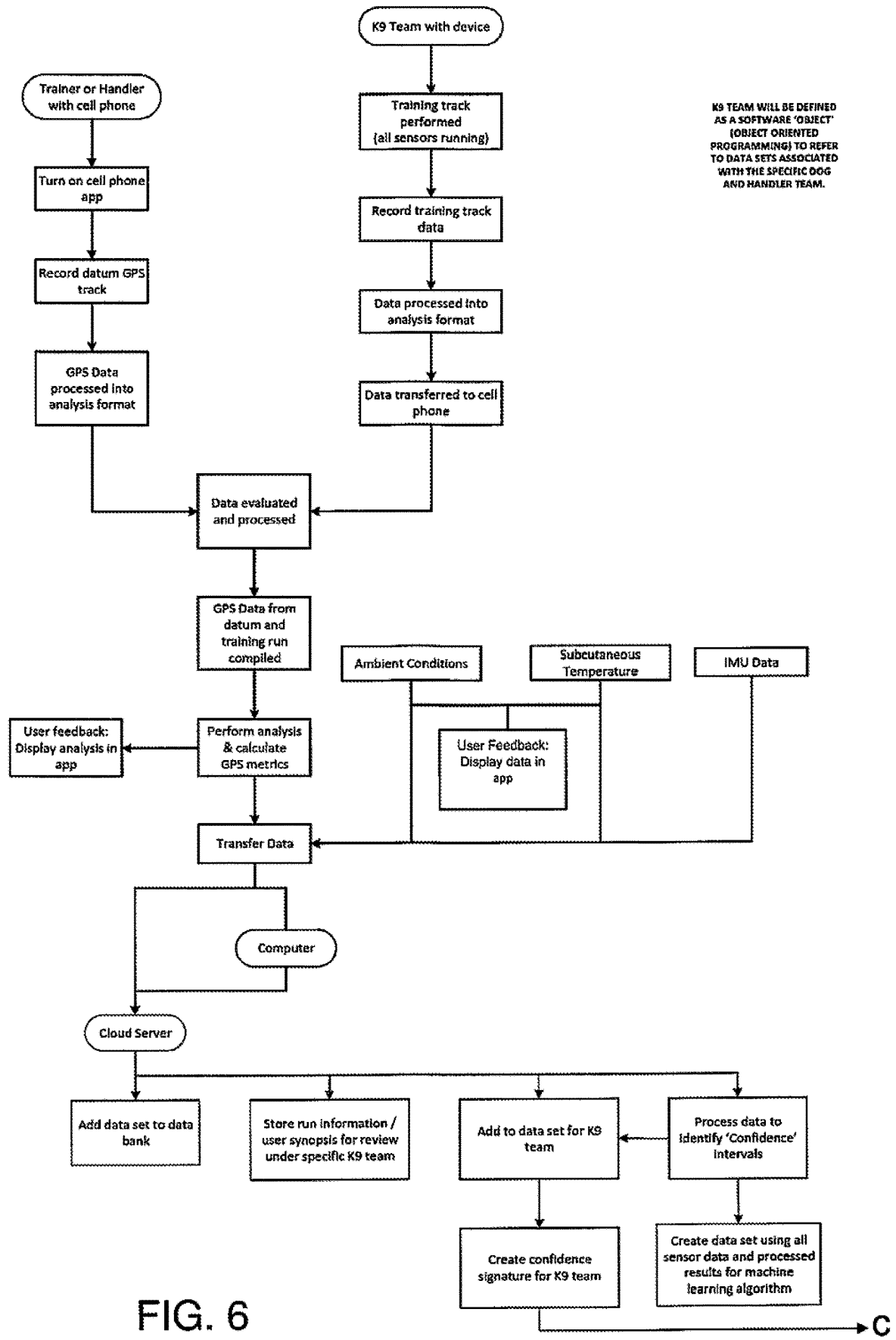
FIG. 6 is a schematic representation of the operation of the system during a training event.

Turning now more particularly to FIG. 6, the general operation of the system during a training session is represented. The process begins with the handler walking along the prescribed path to generate the target location data that is ready for analysis by the system. Before a training run involving the service animal, a team object is created which identifies the unique pairing of the handler and the animal. The animal then tracks the prescribed path of the handler so that animal location data is collected relating to the animal path followed by the service animal. All data is processed into analysis form and includes the team object identifications associated therewith. Additional data relating to ambient conditions, temperature of the animal, and IMU data are also associated with the collected location data.

A comparison analysis can then be executed to generate a suitable map for display on the handler device. The rank metric can be calculated as a measure of deviation or an overall measure of similarity that also factors in speed and acceleration and other measured conditions including a measure of linearity as determined using the IMU data. Using a comparison of the calculated rank metric to a similarity threshold, regions of high confidence on the map can be identified. Various degrees of similarity can be further identified and displayed for example using heat mapping.

The system can also perform various forms of data analysis to look for relations between the collected data and various measured conditions such as heat and humidity. All of the analysed data is relayed to and stored on the remote server. Storage of the current data for a training event always includes the team object with the unique pairing of handler identification and animal identification associated therewith. As part of each training run or at a later date, the system can update the animal signature for the team based on the current run or calculate the animal signature once a certain number of training events have been performed.

Figures 7, 8:
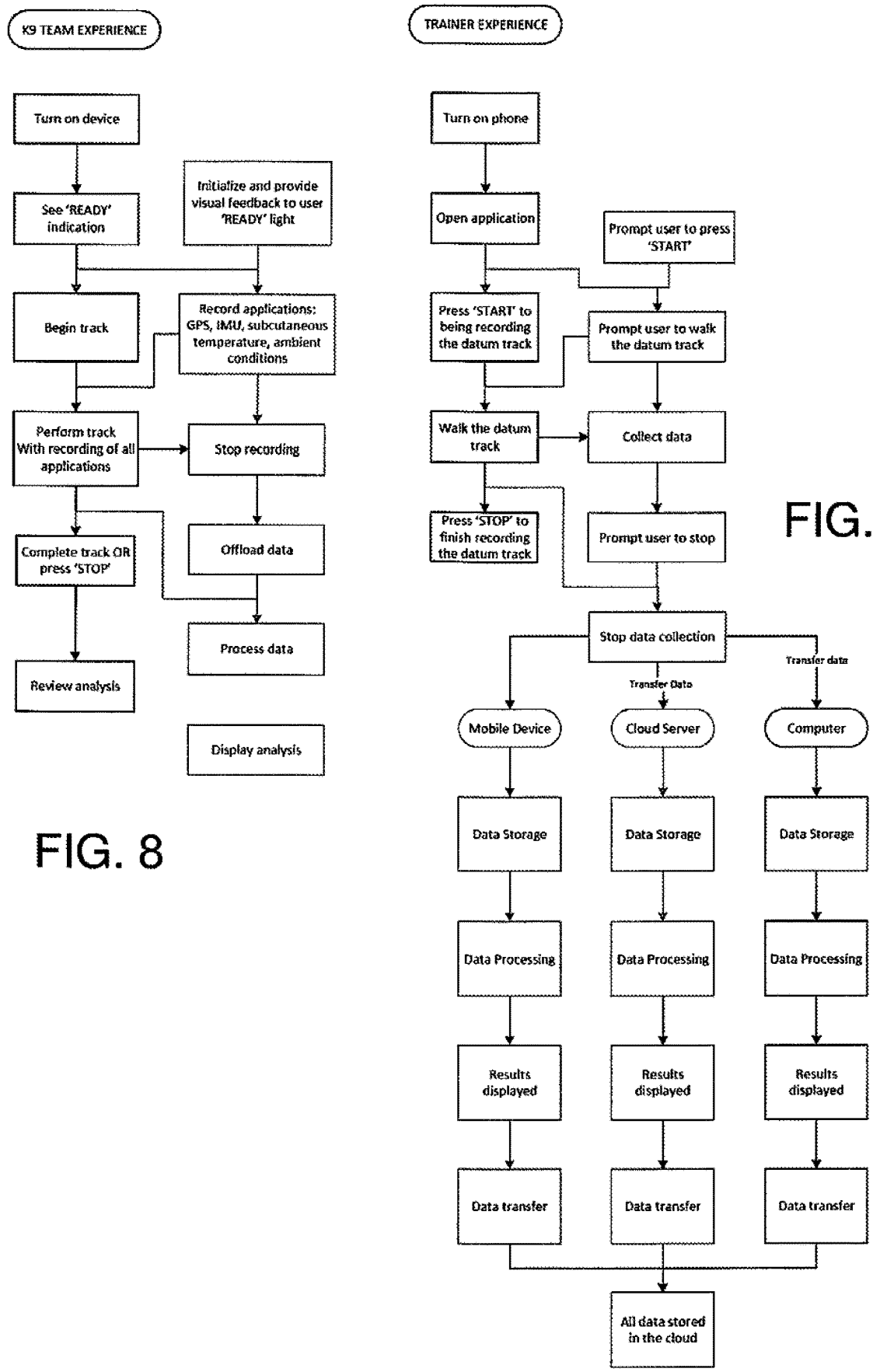
FIG. 7 is a schematic representation of the steps executed by the handler and the system to record a prescribed path prior to a training event.
FIG. 8 is a schematic representation of the steps executed by the handler and the system while the animal tracks the prescribed path during a training event.

Turning now to FIG. 7, in this instance, the steps performed by the handler and the steps of the software interacting with the handler to record the prescribed path are illustrated. The handler will initially activate the handler device and activate the corresponding software that enables the functions of the system 10. The software then prompts the user to press start when they are ready to record a prescribed path. Once the user presses start, the system collects GPS information in addition to various data from the condition sensors on the handler device and/or tracking device. Once prompted to press stop upon completion of the prescribed path, the user will press stop which results in ceasing of the data collection and processing of the data to store the target location data of the prescribed path for use in subsequent analysis during the training event with the animal.

Turning now to FIG. 8, in this instance the steps performed by the handler and the steps of the software interacting with the handler to record the animal path are illustrated. The handler will initially activate the handler device and activate the corresponding software that enables the functions of the system 10. The software then prompts the user to begin recording the animal path. Once the user starts the training event, the software records all relevant data from the handler device and the tracking device.

Throughout the process, the temperature of the animal is monitored and continuously compared to a temperature threshold. If the temperature threshold is exceeded at any time, an alert is generated through the indicator of the tracking device and/or the indicator or display of the handler device to indicate the animal is under distress. This monitoring of the animal temperature using the subcutaneous sensor 40 is also done while undergoing missions for tracking an unknown path.

Once it is determined that tracking of the prescribed path has been completed, for example when the location data of the animal along the animal path matches the target location data defining the end of the prescribed path, the software requests confirmation from the handler that the training event is complete through a suitable prompt. Upon confirmation by the operator or handler, the system stops collecting data and then transmits the data to the remote server.

Data processing can occur entirely at the handler device, entirely at the remote server, or any combination thereof. The various analysis includes calculation of the comparison metric for display to the operator using maps and the like, as well as the option to calculate a rank metric representative of the performance of the animal compared to the average performance of animals in previous training events.

The calculation of the rank metric for a particular tracking event can be weighted by track difficulty. The difficulty of the track can be determined by such factors as the number of turns, the change in elevation, ambient conditions, if the track is rural, urban or a combination of both, or any combination of these factors.

Figure 9:
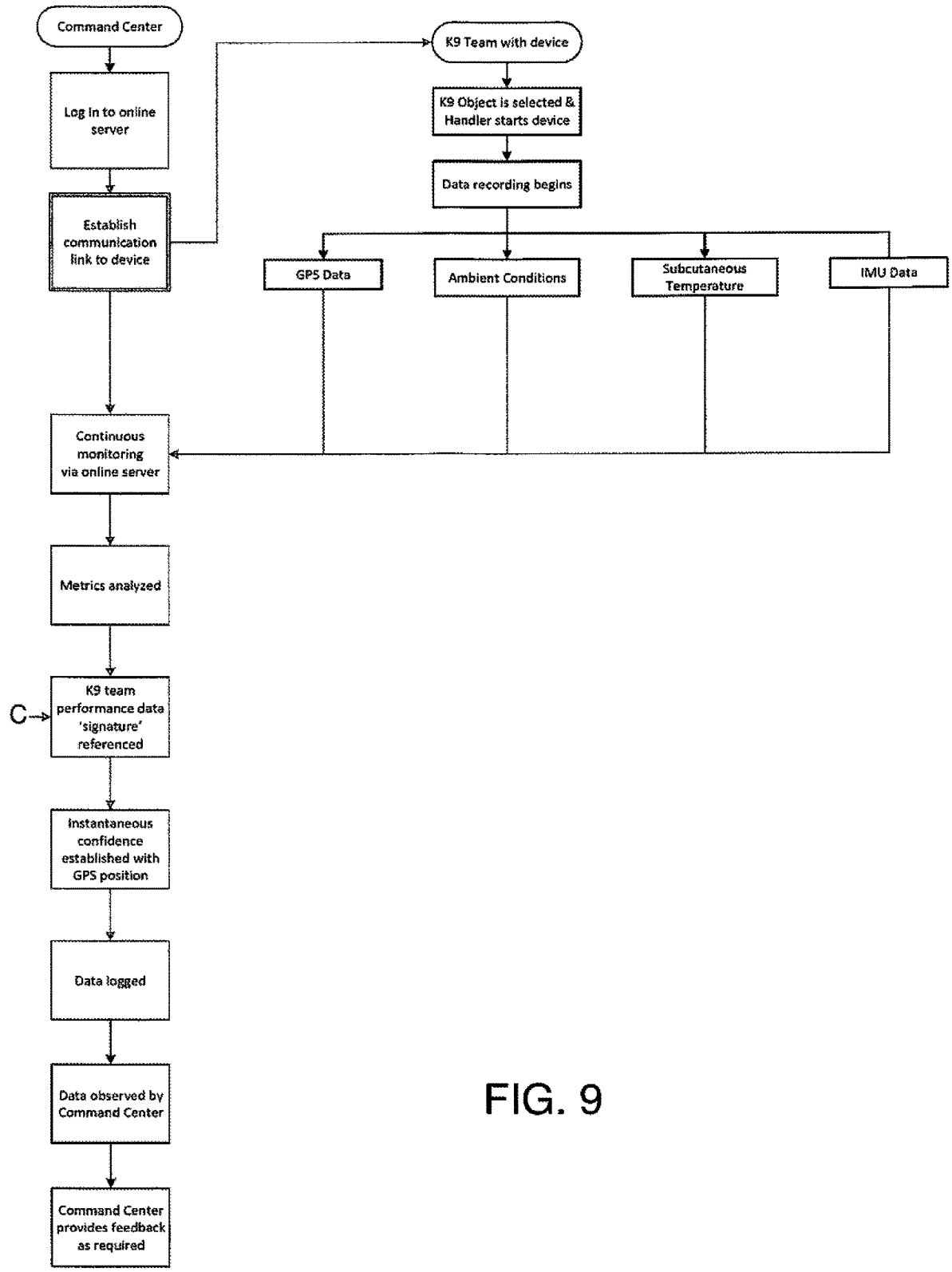
FIG. 9 is a schematic representation of the operation of the system during a mission event.

Turning now to FIG. 9, the various steps performed by the software during a mission in which an animal is tracking an unknown path will now be described. Initially the handler communicates with the software through the handler device to select the relevant animal identification and handler identification corresponding to the current canine team object. The animal, guided by the handler, then tracks the unknown path while the software continuously monitors the data generated by the various sensors of the tracking device and the handler device including the GPS sensors and the IMU measurement unit, and further including the subcutaneous temperature sensor 40. The data analysis occurs in real time. The system compares the current performance data to the animal signature so that a calculation of the confidence metric can occur. The confidence metric is effectively an estimate of the rank metric by using the animal signature to determine what rank metric value is associated with auxiliary data that is similar to the performance data collected from the current tracking event.

Figure 10:
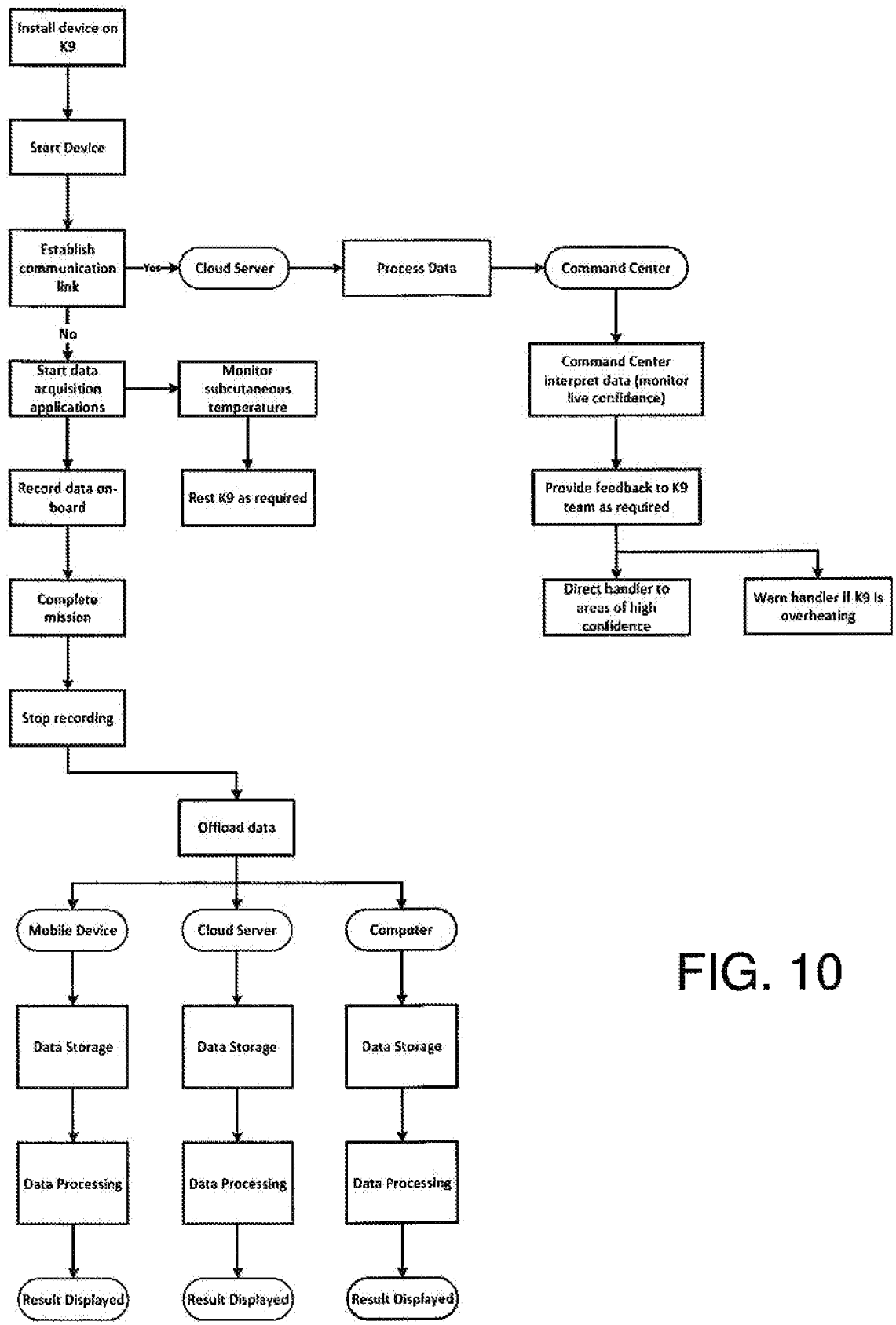
FIG. 10 is a schematic representation of the steps executed by the handler and the system while the animal tracks an unknown path during a mission event.
Figure 11:
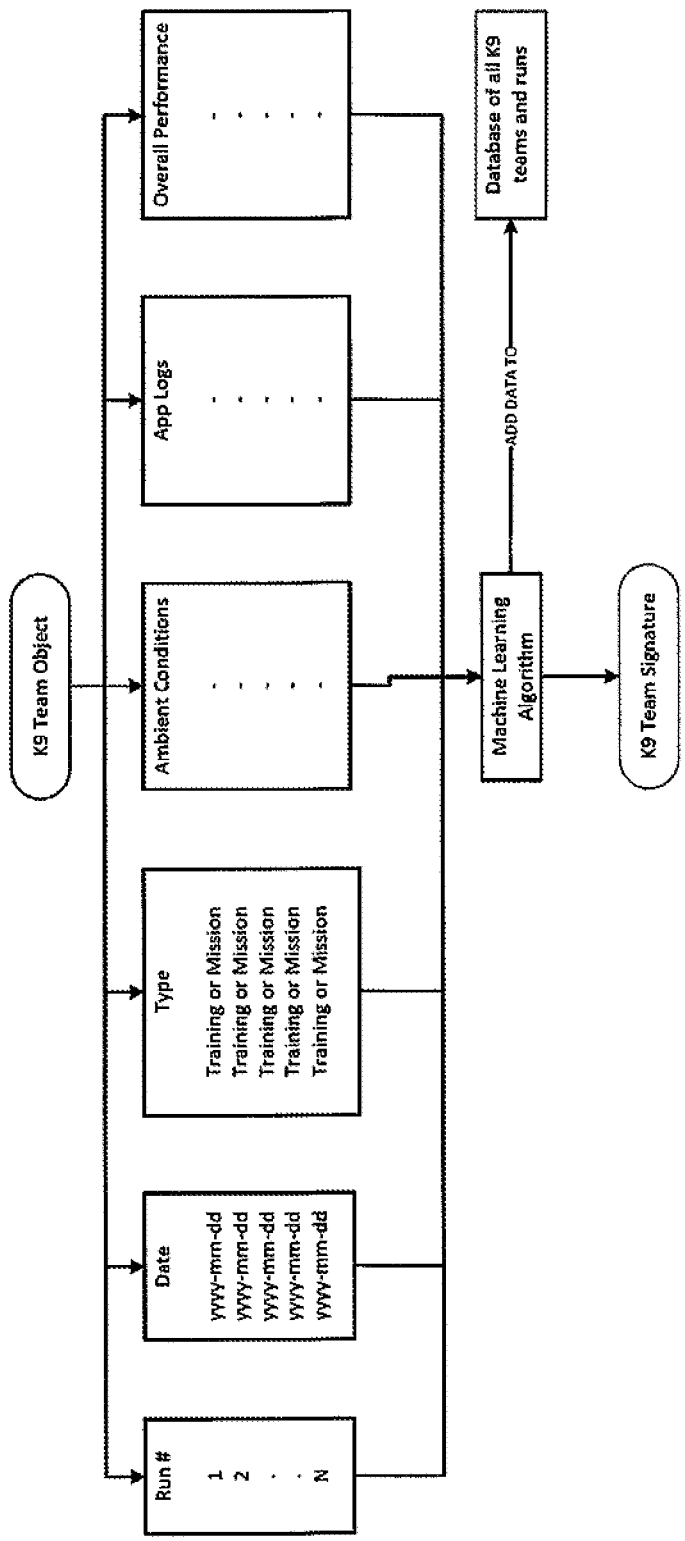
FIG. 11 is a schematic representation of the data sets used by the machine learning algorithm to establish each animal signature.

Turning now to FIG. 10, various steps are illustrated that are performed by the handler, an operator at the remote server, and the software of the system in parallel with one another during a mission where the animal is tracking an unknown path. From the perspective of the handler, the handler device is activated and the appropriate software is activated for communication with the tracking device so that data from all of the relevant components can be monitored throughout the mission event. The handler can also subjectively monitor behaviour of the animal to gauge the confidence in the animal's tracking ability. The handler can communicate with an operator at the remote server if it is determined subjectively that confidence in the tracking ability of the animal has been lost.

At the remote server, the operator identifies the relevant canine team object based on the animal identification and the handler identification so that the relevant historical data relating to previous training events can be recalled by the remote server including the animal signature representative of the relationship between past rank metric performance of the animal during past tracking events and the corresponding auxiliary data collected during the past tracking events. As noted above, the collected performance data from a current run and the animal signature can be used to calculate an estimate of the rank metric for the current tracking event, known as the confidence metric. The command centre formed at the location of the remote server relays appropriate commands to the handler during tracking. In the event that the handler indicates that confidence in the tracking ability has been lost by a subjective analysis, the operator at the remote server can use the analysed data to identify the most recent previous instance where the confidence metric remained within the range of the confidence threshold indicating a region of high confidence. The handler can then be directed to this location on the map to resume tracking from the region of high confidence.

During the mission, the software of the system is executed by the processors of the relevant components to collect data and communicate the data to the handler device and the remote server for processing. An operator at the remote server can monitor the data in real time and interpret the data while the handler's attention is focused on managing the service animal during tracking. All collected data is stored at the remote server. The system can make a determination that the mission event resulted in successful tracking or resulted in a failure dependent upon the confidence measures.

Over time, the remote server is used to collect and store data and create a depository that allows various forms of data analysis to be used by the system. For instance, canine team objects can be identified for selection at the start of training or mission events. A database is created of training events and mission events where all data is tagged according to the relevant canine team object associated therewith, the date, the category of data such as training event or mission event, identification of the service animal and identification of the handler associated with the canine team object, etc. The data could be subsequently recalled for viewing on a display or other analysis by organizing the data according to date, event type, ambient conditions, or any of the calculated metrics, or based on specific criteria such as thresholds being met or exceeded.

Machine learning can be used in various manners for assisting in analysing the data to establish the animal signature, and to calculate the confidence metric using the established animal signature. For example, data sets of intervals of high confidence common to one or all canine team objects can be created or identified. A fully connected neural network with all relevant log data can be built and global high confidence traits can be established.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A tracking evaluation system for measuring tracking ability of a service animal accompanied by a handler while tracking a prescribed path during a tracking event, the system comprising:
a tracking device arranged to be carried with the service animal, the tracking device comprising a location sensor arranged to sense animal location data representative of a location of the service animal as the service animal travels along an animal path during the tracking event;
a measurement unit operatively connected to the tracking device, the measurement unit being arranged to measure auxiliary data related to movement of the tracking device in real time as the tracking device is displaced along the animal path during the tracking event; and
a computer apparatus comprising a memory storing programming instructions thereon and a processor arranged to execute the programming instructions so as to be arranged to (i) store target location data representative of the prescribed path, (ii) receive the animal location data from the tracking device, (iii) calculate a rank metric which represents a measure of similarity between the animal location data of the animal path and the target location data of the prescribed path, along the prescribed path, such that the rank metric is calculated in real time as an instantaneous value that varies along the animal path, (iii) store the auxiliary data in association with the instantaneous value of the rank metric and (iv) calculate an animal signature representative of a relationship between the auxiliary data and the rank metric for different instantaneous values of the rank metric.

2. The system according to claim 1 further comprising a display in communication with the processor of the computer apparatus, the processor being arranged to execute the programming instructions so as to be arranged to display a map including both the prescribed path and the animal path thereon.

3. The system according to claim 1 wherein the calculation of the rank metric is based upon a deviation of the animal location data from the target location data along the prescribed path.

4. The system according to claim 3 wherein the calculation of the rank metric is further based upon a speed of the animal along the animal path.

5. The system according to claim 4 wherein the processor is arranged to calculate the speed based on the animal location data.

6. The system according to claim 1 wherein the processor is arranged to execute the programming instructions so as to be arranged to identify different regions along the animal path having different measures of similarity by comparing the rank metric to one or more similarity thresholds.

7. The system according to claim 6 further comprising a display in communication with the processor of the computer apparatus, the processor being arranged to execute the programming instructions so as to be arranged to display a map that visually distinguishes between the different regions that have different instantaneous values of the rank metric.

8. The system according to claim 1 wherein the tracking device includes a unique animal identification stored thereon that identifies the service animal and wherein the computer apparatus includes a unique handler identification stored thereon that identifies the handler, the processor of the computer apparatus being arranged to execute the programming instructions so as to be arranged to store the rank metric on the computer apparatus with both the unique animal identification and the unique handler identification associated therewith for subsequent retrieval by the processor to calculate the animal signature.

9. The system according to claim 1 wherein the measurement unit includes an acceleration sensor carried on a wearable device adapted to be worn by the service animal to record animal movement data representative of movement of the head and/or gate of the animal as the animal moves along the animal path.

10. The system according to claim 1 wherein the measurement unit includes an ambient condition sensor arranged to measure one or more ambient conditions, the processor of the computer apparatus being arranged to execute the programming instructions so as to be arranged to record the rank metric with the one or more ambient conditions associated therewith.

11. The system according to claim 1 for use in measuring an ability of the service animal to track an unknown path, the system comprising:
the processor of the computer apparatus being arranged to execute programming instructions so as to (i) store the auxiliary data from the measurement unit as the service animal tracks the unknown path, and (ii) calculate a confidence metric based on the calculated animal signature and the auxiliary data collected while the animal tracks the unknown path, the confidence metric representing a quantitative measure of the ability of the service animal to track the unknown path.

12. The system according to claim 11 wherein the computer apparatus is arranged to calculate the confidence metric in real time as the service animal travels along the unknown path.

13. The system according to claim 12 wherein the computer apparatus is arranged to compare the confidence metric to a confidence threshold in real time and generate an alert if the confidence metric falls below the confidence threshold.

14. The system according to claim 12 wherein the computer apparatus is arranged to store the confidence metric in association with the animal location data from the tracking device as the confidence metric varies along the animal path.

15. The system according to claim 1 wherein the tracking device includes a communication antenna, a memory storing programming instructions thereon, and a processor in operative communication with the memory of the tracking device, the location sensor and the communication antenna of the tracking device, the processor being arranged to execute the programming instructions stored on the memory so as to be further arranged to receive the animal location data from the location sensor and transmit the animal location data wirelessly to the computer apparatus.

16. The system according to claim 1 wherein the tracking device includes a condition sensor operatively connected thereto and arranged to sense at least one condition as the service animal travels along an animal path.

17. The system according to claim 16 wherein the condition sensor includes an ambient weather condition sensor arranged to measure one or more ambient weather conditions, the processor of the computer apparatus being arranged to execute the programming instructions so as to be arranged to store the rank metric with the one or more ambient conditions associated therewith.

18. The system according to claim 16 wherein the condition sensor includes an internal condition sensor arranged to be inserted subcutaneously within the tracking animal so as to be arranged to measure one or more biological conditions of the tracking animal, the processor of the computer apparatus being arranged to execute the programming instructions so as to be arranged to store the rank metric with the one or more biological conditions associated therewith.

19. The system according to claim 1 wherein the computer apparatus includes a portable operator device arranged to be carried by an operator, the operator device being arranged to receive the animal location data wirelessly from the tracking device.

20. The system according to claim 19 wherein the memory and the processor that are arranged to calculate the rank metric are located on the portable operator device.

21. The system according to claim 19 wherein the computer apparatus further includes a remote server in communication with the portable operator device over a wireless communications network, the processor being arranged to execute the programming instructions so as to be arranged to transmit the rank metric from the portable operator device to the remote server for storage on the remote server, the remote server being in communication with a plurality of different portable operator devices that are identical in configuration so as to be arranged to receive the rank metrics from the plurality of different portable operator devices.

22. The system according to claim 19 wherein the portable operator device includes a location sensor arranged to sense operator location data representative of a location of the operator, the processor being arranged to execute the programming instructions so as to be arranged to store the target location data representative of the prescribed path on the portable operator device by (i) receiving the operator location data as the operator walks along the prescribed path and (ii) using the operator location data to define the target location data.

23. A tracking evaluation system for measuring tracking ability of a service animal accompanied by a handler while tracking an unknown path, the system comprising:
  a tracking device arranged to be carried with the service animal, the tracking device comprising a location sensor arranged to sense animal location data representative of a location of the service animal as the service animal travels along an animal path, and a measurement unit arranged to be carried on the service animal to measure non-location auxiliary data including accelerations related to movement of the animal while the tracking device is displaced along the animal path; and
  a computer apparatus comprising a memory storing programming instructions thereon and a processor arranged to execute the programming instructions so as to be arranged to:
  (i) store an animal signature representative of a relationship between (i) the auxiliary data from previous tracking events and (ii) a measure of tracking ability of the service animal based on deviation of a path of the tracking device from a known path from the previous tracking events;
  (ii) store the auxiliary data collected as the service animal tracks the unknown path;
  (iii) calculate a confidence metric based on the calculated animal signature and the auxiliary data collected while the animal tracks the unknown path, the confidence metric representing a quantitative measure of the ability of the service animal to track the unknown path.

24. The system according to claim 23 wherein the computer apparatus is arranged to calculate the confidence metric as an instantaneous value at each time step.

25. The system according to claim 23 wherein the computer apparatus is arranged to calculate the confidence metric as an overall value representative of a range of time stamps or a duration of the tracking of the unknown path.

* * * * *